US011267933B2

(12) United States Patent
Kim et al.

(10) Patent No.: US 11,267,933 B2
(45) Date of Patent: Mar. 8, 2022

(54) METHOD OF PREPARING POLY(ETHER ESTER) COPOLYMER

(71) Applicant: LG CHEM, LTD., Seoul (KR)

(72) Inventors: Jeongnam Kim, Daejeon (KR); Hyungmin Ahn, Daejeon (KR); Dae Chul Kim, Daejeon (KR); Sung Hyun Park, Daejeon (KR); Myung Han Lee, Daejeon (KR); Jeongyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 52 days.

(21) Appl. No.: 16/760,234

(22) PCT Filed: Oct. 30, 2018

(86) PCT No.: PCT/KR2018/013024
§ 371 (c)(1),
(2) Date: Apr. 29, 2020

(87) PCT Pub. No.: WO2019/103339
PCT Pub. Date: May 31, 2019

(65) Prior Publication Data
US 2020/0354511 A1 Nov. 12, 2020

(30) Foreign Application Priority Data

Nov. 24, 2017 (KR) .................. 10-2017-0158925
Oct. 29, 2018 (KR) .................. 10-2018-0130140

(51) Int. Cl.
C08G 63/672 (2006.01)
C08G 63/183 (2006.01)
C08G 63/85 (2006.01)

(52) U.S. Cl.
CPC ......... *C08G 63/183* (2013.01); *C08G 63/672* (2013.01); *C08G 63/85* (2013.01)

(58) Field of Classification Search
USPC ................. 528/271, 272, 274, 279
See application file for complete search history.

(56) References Cited

U.S. PATENT DOCUMENTS

| 4,680,376 A | 7/1987 | Heinze et al. |
| 5,015,759 A | 5/1991 | Lowe |
| 5,407,981 A | 4/1995 | Kim et al. |
| 5,941,956 A | 8/1999 | Shirakihara et al. |
| 6,833,428 B1 | 12/2004 | Kato |
| 7,829,654 B2 | 11/2010 | Kämpf |
| 2009/0072184 A1 | 3/2009 | Yamaoka |
| 2011/0288264 A1 | 11/2011 | Yamaoka |

FOREIGN PATENT DOCUMENTS

| CN | 103012761 B | 1/2015 |
| CN | 106188513 A | 12/2016 |
| JP | S52-029893 A | 3/1977 |
| JP | S62-195017 A | 8/1987 |
| JP | H04-108760 A | 4/1992 |
| JP | H04-352878 A | 12/1992 |
| JP | H08-070300 A | 3/1996 |
| JP | 2000-191758 A | 7/2000 |
| JP | 2002-088144 A | 3/2002 |
| JP | 2003-012783 A | 1/2003 |
| JP | 2004-204039 A | 7/2004 |
| JP | 2006-316262 A | 11/2006 |
| JP | 2008-094934 A | 4/2008 |
| JP | 2010-024328 A | 2/2010 |
| JP | 2010-248405 A | 11/2010 |
| KR | 10-1996-0009291 B1 | 7/1996 |
| KR | 10-0132280 B1 | 4/1998 |
| KR | 10-2002-0027554 A | 4/2002 |
| KR | 10-2012-0075120 A | 7/2012 |
| TW | 546319 B | 8/2003 |

OTHER PUBLICATIONS

International Search Report from PCT/KR2018/013024, dated Apr. 24, 2019.
Written Opinion of the ISA from PCT/KR2018/013024, dated Apr. 24, 2019.
Zhang et al., "Synthesis of Poly(butylene terephthalate)-Poly(tetramethylene glycol) Copolymers Using Terephthalic Acid As Starting Material: A Comparation Between Two Synthetic Strategies", Chinese Journal of Polymer Science, vol. 33, No. 9, 2015, pp. 1283-1293.
Chang et al., "Block Copolyetheresters. Part 3: Preparation of Block Copolyetheresters By A Terephthalic Acid Process In The Presence Of Salts", Polym. Eng. Sci. 35, 1995, pp. 190-194.
Office Action of Chinese Patent Office in Appl'n No. 201880057434.1 dated Sep. 1, 2021.

*Primary Examiner* — Terressa Boykin
(74) *Attorney, Agent, or Firm* — Dentons US LLP

(57) ABSTRACT

A method of preparing a poly(ether ester) copolymer is provided, and more particularly, a method of preparing a poly(ether ester) copolymer having a high content of a polyether and high viscosity by using a dicarboxylic acid as a starting material is provided. According to the present invention, a dicarboxylic acid of which production cost is low is used as a starting material to prepare a poly(ether ester) copolymer having a high content of polyether and having a high viscosity without solid-phase polymerization.

12 Claims, No Drawings

METHOD OF PREPARING POLY(ETHER ESTER) COPOLYMER

The present application is a National Phase entry of International Application No. PCT/KR2018/013024 filed on Oct. 30, 2018, and claims priority to and the benefit of Korean Patent Application No. 10-2017-0158925 filed on Nov. 24, 2017, and Korean Patent Application No. 10-2018-0130140 filed on Oct. 29, 2018, which are hereby incorporated by reference in their entireties into this application.

FIELD

The present invention relates to a method of preparing a poly(ether ester) copolymer, and more particularly, to a method of preparing a poly(ether ester) copolymer having a high content of polyether and a low hardness property and having high viscosity by using a dicarboxylic acid as a starting material.

BACKGROUND

Thermoplastic poly(ether ester) elastomers (TPEEs) are high performance materials that have both elasticity of rubber and molding processability of plastic. TPEEs are substitutes for vulcanized rubber and PVC (polyvinyl chloride), and are used in a wide variety of fields such as automobiles, home appliances, building materials, IT, articles for daily use, etc. TPEEs are represented by poly(ether ester)-based block copolymer resin compositions.

Poly(ether ester) copolymers have elastomeric properties by including a hard segment consisting of a diol and a dicarboxylic acid, and a soft segment consisting of a polyether diol and a dicarboxylic acid. The hard segment provides mechanical properties for elastomers and the soft segment provides elasticity and flexibility for elastomers.

These thermoplastic poly(ether ester) copolymers are commercially prepared by a two-step reaction including an ester exchange reaction of a diol, a dicarboxylate, and a polyether diol as raw materials, followed by a polycondensation reaction of the reaction product.

For example, one of widely known TPEE, polybutylene terephthalate (PBT)-poly(tetramethylene ether glycol) (PTMG) copolymer is prepared through an ester exchange reaction and a polycondensation reaction using 1,4-butylene glycol (BG), dimethyl terephthalate (DMT), and PTMG as starting materials.

Meanwhile, a method of using, instead of dicarboxylate, corresponding dicarboxylic acid has been developed. In this case, an esterification reaction, not the ester exchange reaction, occurs and water is produced as a by-product instead of alcohol. For example, the PBT-PTMG copolymer may be prepared using terephthalic acid (PTA) instead of DMT as a starting material, and there is an advantage in economic efficiency because the production cost of PTA is lower than that of DMT.

However, when the starting material is simply replaced by a dicarboxylic acid in the conventional process of using a dicarboxylate, there is a problem in that esterification does not properly occur, and thus productivity is decreased. This phenomenon becomes worse as a content of polyether diol in the starting materials is higher. Therefore, it has been difficult to produce poly(ether ester) copolymers having a high content of polyether and low hardness by the known dicarboxylate-based process.

To solve this problem, it has been suggested that when the PBT-PTMG copolymer is prepared, BG and PTA are first reacted to prepare a prepolymer, which is then reacted with PTMG (Chinese J. Polym. Sci. 33 (2015) 1283-1293). However, this preparation method has a problem in that esterification becomes complicated with two steps. In addition, in order to increase viscosity of the low-hardness poly(ether ester) copolymer, a solid-phase polymerization reaction must be further performed after the polycondensation reaction. As a result, the preparation process becomes complicated and is not suitable for mass production.

Accordingly, there is a demand for a method of preparing a poly(ether ester) copolymer in a simple and economical manner, which is thus suitable for mass production, wherein a dicarboxylic acid is used as a starting material to prepare a poly(ether ester) copolymer having high viscosity, while having a low hardness property due to a high content of a polyether.

Non-Patent Document 1: Chinese J. Polym. Sci. 33 (2015) 1283-1293

SUMMARY

An object of the present invention is to provide a method of preparing a poly(ether ester) copolymer having a high content of a polyether while having low hardness and high viscosity, without solid-phase polymerization, by using a dicarboxylic acid as a starting material.

To solve the above problem, the present invention provides a method of preparing a poly(ether ester) copolymer having a polyether content of 60% by weight to 90% by weight and an intrinsic viscosity at 25° C. of more than 2.0, the method including:

forming a reaction mixture by reacting a mixture comprising a diol, a dicarboxylic acid, a polyether diol, and a first amount of a catalyst;

introducing an additional amount of the catalyst to the reaction mixture and performing a first polycondensation to prepare a prepolymer; and performing a second polycondensation of the prepolymer under a lower pressure condition than that of the first polycondensation, wherein a molar ratio of the diol/dicarboxylic acid introduced in the reaction mixture is more than 2.5, and the amount of the catalyst introduced each of the reaction mixture and the first polycondensation is 50 ppm or more, based on an active metal.

The forming of the reaction mixture may be performed in a reactor equipped with a distillation column which is maintained at 80° C. to 150° C.

The forming of the reaction mixture may be performed under a temperature of 150° C. to 300° C. and a pressure of 100 torr to 760 torr.

The first polycondensation may be performed under a temperature of 180° C. to 250° C. and a pressure of more than 5 torr and 100 torr or less.

The second polycondensation may be performed under conditions of a temperature of 180° C. to 250° C. and a pressure of 5 torr or less.

The total amount of the catalyst introduced in forming the reaction mixture and the first polycondensation may be less than 500 ppm.

The polyether diol may have a number average molecular weight of 500 g/mol to 3000 g/mol.

Preferably, the poly(ether ester) copolymer may have an intrinsic viscosity at 25° C. of 2.2 or more.

The poly(ether ester) copolymer may have a melt index of 12 g/10 min or less, as measured in accordance with ASTM D1238.

The poly(ether ester) copolymer may have Shore D hardness of 40 or less.

According to the present invention, a dicarboxylic acid of which production cost is low is used as a starting material to prepare a poly(ether ester) copolymer having low hardness and a high content of a polyether and having a high intrinsic viscosity of more than 2.0 without solid-phase polymerization.

DETAILED DESCRIPTION

The terms used in this description are just for explaining exemplary embodiments and are not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

The present invention may be variously modified and have various forms, and specific examples will be exemplified and explained in detail below. However, it is not intended to limit the present invention to the specific examples, and it must be understood that the present invention includes all modifications, equivalents, or replacements included in the spirit and technical scope of the present invention.

Hereinafter, the present invention will be described in detail.

The present invention provides a method of preparing a high-viscosity poly(ether ester) copolymer having a polyether content of 60% by weight to 90% by weight and an intrinsic viscosity at 25° C. of 2.0 or more, the method including:

a) an esterification step of reacting a diol, a dicarboxylic acid, and a polyether diol in the presence of a catalyst;

b) a first polycondensation step of further introducing an additional amount of the catalyst to the reaction mixture of the step a) and performing polycondensation under reduced pressure to prepare a prepolymer; and c) a second polycondensation step of performing polycondensation of the prepolymer under a lower pressure condition than that of the step b), wherein a molar ratio of the diol/dicarboxylic acid introduced in the step a) is more than 2.5, and the amount of the catalyst introduced each in the steps a) and b) is 50 ppm or more, based on an active metal.

According to the preparation method of the present invention, a cheaper dicarboxylic acid, instead of a dicarboxylate, is used as a starting material, thereby preparing a high-viscosity poly(ether ester) copolymer having a high content of a polyether, a low hardness property, and having an intrinsic viscosity of more than 2.0, even without modification of the known dicarboxylate process.

The preparation method of the present invention may be performed using conventional dicarboxylate production facilities or conventional PBT production facilities using the dicarboxylic acid, and may not require the two steps of esterification and solid-phase polymerization, thereby greatly reducing production costs and process operating costs and improving productivity. Therefore, the preparation method of the present invention is suitable for mass production.

In the present invention, the thermoplastic poly(ether ester) copolymer may be prepared by performing esterification of a diol, a dicarboxylic acid, and a polyether diol as starting materials in the presence of a catalyst, transferring the obtained reaction mixture to a separate polycondensation reactor, and then performing polycondensation of the reaction mixture in the presence of an additional amount of the catalyst.

In the present invention, the diol is an aliphatic or alicyclic diol having 2 to 10 carbon atoms and having a molecular weight of 300 g/mol or less, which is preferred in terms of achieving the effects of the present invention. Specifically, examples of the diol which may be used in the present invention may include aliphatic diols such as 1,4-butylene glycol(1,4-butanediol), monoethylene glycol, diethylene glycol, propylene glycol, neopentyl glycol, etc.; and alicyclic diols such as 1,1-cyclohexane dimethanol, 1,4-cyclohexane dimethanol, tricyclodecane dimethanol, etc., but are not limited thereto. Specifically, in the present invention, the diol may be 1,4-butylene glycol.

Examples of the dicarboxylic acid which may be used in the present invention may include terephthalic acid, isophthalic acid, naphthalene dicarboxylic acid, adipic acid, and sebacic acid, but are not limited thereto. Specifically, the dicarboxylic acid may be terephthalic acid.

In the preparation method of the present invention, the diol and the dicarboxylic acid are included in a particular content ratio so that a poly(ether ester) copolymer having a low hardness property by including 60% by weight or more of the polyether is allowed to have high viscosity even without solid-phase polymerization. That is, to prepare the poly(ether ester) copolymer having low hardness and high viscosity without solid-phase polymerization, a molar ratio of the diol/dicarboxylic acid introduced in the esterification step of the present invention may be in the range of more than 2.5, 2.6 or more, or 2.8 or more, and 4 or less, 3.7 or less, or 3.5 or less.

As such, only when the molar ratio of the diol/dicarboxylic acid exceeds 2.5, the low-hardness poly(ether ester) copolymer having the polyether content of 60% by weight to 90% by weight may be prepared at a high viscosity even without the solid-phase polymerization.

The low hardness' property is a property obtained when the polyether content in the poly(ether ester) copolymer is 60% by weight or more. Specifically, when the copolymer has hardness of Shore D 40 or less, and preferably hardness of Shore D 35 or less, it is considered to be a low-hardness poly(ether ester) copolymer. The lower limit of the hardness of the low-hardness poly(ether ester) copolymer may be, but is not particularly limited to, for example, Shore D 20 or more, or Shore D 25 or more. The poly(ether ester) copolymer having the low hardness property may be more appropriately applied to grip parts of IT devices, high elastic fibers, etc.

Meanwhile, the reference value of 'high viscosity' differs according to the hardness property of the poly(ether ester) copolymer, and the reference value of 'high viscosity' of a low-hardness poly(ether ester) copolymer is higher than that of a high-hardness poly(ether ester) copolymer. Specifically, when a high-hardness poly(ether ester) copolymer having a polyether content of less than 60% by weight has an intrinsic viscosity at 25° C. of about 1.2 or more, it is recognized that the copolymer satisfies the high viscosity property. However, when the low-hardness poly(ether ester) copolymer having the polyether content of 60% by weight or more which is prepared according to the preparation method of the present invention has an intrinsic viscosity at 25° C. of more than 2.0, it may be recognized that the copolymer satisfies the high viscosity property. Preferably, the poly(ether ester) copolymer prepared according to the present invention has an intrinsic viscosity at 25° C. of more than 2.0, and more preferably 2.2 or more.

Meanwhile, even though the molar ratio of the diol/dicarboxylic acid exceeds 4, it is possible to prepare a high-viscosity copolymer. However, there is a disadvantage that energy consumption in the polycondensation is increased in order to remove excess diol. Therefore, the molar ratio is preferably 4 or less.

Meanwhile, the poly(ether ester) copolymer finally prepared in the present invention satisfies the polyether content in the range of 60% by weight to 90% by weight, or 70% by weight to 90% by weight. When satisfying the above range, there is an effect that a low-hardness poly(ether ester) copolymer is prepared.

The polyether content in the prepared copolymer may be controlled by controlling the amount of the polyether diol that is introduced for esterification. Specifically, to obtain the above range of the polyether content, the polyether diol which is a starting material may be used in an amount of 35% by weight to 90% by weight, or 40% by weight to 85% by weight, with respect to a total of 100% by weight of the starting materials consisting of the diol, the dicarboxylic acid, and the polyether diol.

The polyether diol which may be used in the present invention may be in the form of a homopolymer or a copolymer, and specific examples thereof may include one or more selected from the group consisting of polytetramethylene glycol, polyethylene glycol, polypropylene glycol, polyethylene glycol-polypropylene glycol-polyethylene glycol, and polyhexamethylene glycol, but are not limited thereto. Specifically, the polyether diol may be polytetramethylene glycol.

In this regard, a number average molecular weight (Mn) of the polyether diol is not particularly limited, but when the number average molecular weight (Mn) is in the range of 500 g/mol to 3000 g/mol, 1000 g/mol to 2500 g/mol, or 1500 g/mol to 2200 g/mol, it is suitable for the preparation of a poly(ether ester) copolymer having the polyether content of 60% by weight or more, and it is preferred in terms of securing the effect of the preset invention. The number average molecular weight may be determined by, for example, gel permeation chromatography (GPC) or end-group titration (where the end group of a polyether diol is acetylated using acetic anhydride, unreacted acetic anhydride is decomposed to acetic acid, an OH value of the acetylated polyether diol is determined by back titration using an alkali, and the number average molecular weight of the polyether diol is determined from the OH value) or $^1$H NMR analysis of the OH end group.

The esterification reaction of reacting the diol, dicarboxylic acid, and polyether diol may be performed in the presence of a catalyst. In this regard, a substance known in the art may be appropriately used as the catalyst. Specifically, the catalyst may be a catalyst including titanium or tin as an active metal, and more specifically, the catalyst may include titanium-based catalysts such as tetrabutyl titanate (TBT), tetraethyl titanate, and tetra(isopropyl) titanate, or tin-based catalysts such as n-butyl stannoic acid, octyl stannoic acid, dimethyl tin oxide, dibutyl tin oxide, dioctyl tin oxide, diphenyl tin oxide, tri-n-butyl tin acetate, tri-n-butyl tin chloride, or tri-n-butyl tin fluoride. Further, in addition to the above-mentioned catalysts, catalysts such as oxides or acetates including Mg, Ca, Mn, Zn, Pb, or Zr as the active metal may be used alone or in combination. Among them, titanium-based catalysts such as TBT may be preferably used.

Meanwhile, in the present invention, the catalyst is introduced in the polycondensation step as well as in the esterification reaction.

Generally, during preparation of poly(ether ester) copolymers, the catalysts of the esterification (or transesterification) reaction and the polycondensation reaction are the same as each other. Since no separation process is included between the two reactions, a predetermined amount of the catalyst is introduced at the beginning of the first esterification (or transesterification) reaction or during the reaction, and then the catalyst may not be further added in the polycondensation step.

However, the experimental results of the present inventors confirmed that the catalyst is preferably divided and introduced in each of the esterification reaction step and the polycondensation reaction step in order to prepare a poly(ether ester) copolymer having a high content of polyether diol and high viscosity. Therefore, in the present invention, the catalyst is divided and introduced in each of the esterification reaction step and the first polycondensation reaction step.

Specifically, before beginning of the step a) which is the esterification step and step b) which is the first polycondensation step, 50 ppm or more of the catalyst based on the active metal of the catalyst is introduced with respect to the total weight of the starting materials, respectively, and more specifically, 50 ppm to 250 ppm, or 100 ppm to 200 ppm, of the catalyst is introduced in the steps a) and b), respectively. In this regard, it is preferable that the total amount of the catalyst introduced in the steps a) and b) does not exceed 500 ppm, based on the active metal. If the amount of the catalyst used in each step is less than 50 ppm, the progress of the reaction may slow down due to lack of the catalyst, while if the total amount of the catalyst exceeds 500 ppm, side reactions may occur or the catalyst may remain to act as an impurity in a product. Therefore, the amount of the catalyst is appropriately controlled within the above range.

Hereinafter, each step of the preparation method of the present invention will be described.

Step a) of the present invention is the step of performing esterification of the diol, the dicarboxylic acid, and the polyether diol in the presence of the catalyst, wherein the esterification between the diol and the dicarboxylic acid or the polyether diol and the dicarboxylic acid occurs to produce water and tetrahydrofuran (THF) as by-products.

To achieve the above-described effects of the present invention, the appropriate reaction temperature of step a) is in the range of 150° C. to 300° C., or 200° C. to 240° C., and the appropriate reaction pressure of the step a) is in the range of 100 torr or more to less than 760 torr, 100 torr to 500 torr, or 200 torr to 400 torr. Specifically, after introducing the starting materials and the catalyst into a reactor, the temperature is raised at 0.1° C./min to 10° C./min under stirring until the temperature reaches the above temperature range, and then esterification may be performed for about 30 minutes to 4 hours or for 1 hour to 2 hours.

Since the esterification is a reversible reaction, water and THF, which are by-products, must be removed to ensure that a forward reaction (formation of ester bonds) occurs continuously. However, when the starting material diol is evaporated together during the process, loss of the raw material may occur and the molar ratio of diol/dicarboxylic acid for obtaining the high-viscosity poly(ether ester) copolymer may not be ensured. Therefore, a method of removing water and THF while minimizing evaporation of the diol is required.

To this end, in the present invention, the step a) may be performed under reduced pressure of 100 torr or more to less than 760 torr, 100 to 500 torr, or 200 to 400 torr, as described above, and performed in a reactor equipped with a distillation column which is maintained at 80° C. to 180° C., or 100° C. to 150° C. Under these conditions, a conversion rate of the esterification reaction may be greatly improved, and a low-hardness poly(ether ester) copolymer having a high content of polyether may be prepared. If the reaction is performed at atmospheric pressure (760 torr), the evaporation rate of the diol may be decreased, but the conversion rate of the esterification may be decreased, and thus it is difficult to sufficiently increase the viscosity of the poly (ether ester) copolymer. If the reaction is performed under reduced pressure without the distillation column, the evaporation rate of the diol is too high, and thus there is a problem that the molar ratio of the diol/dicarboxylic acid may not be maintained above 2.5.

In this regard, the distillation column is preferably a packing column or a tray column. More specifically, a structured packing column is preferred.

When the step a) is completed, polycondensation reactions of steps b) and c) are performed. The polycondensation steps may be performed in a reactor separately from the esterification reactor, and may be performed without the distillation column. Specifically, the polycondensation step may be performed after adding an additional amount of the catalyst, in an amount of 50 ppm or more based on the active metal to the reaction mixture in which the reaction of the step a) is completed.

In the present invention, the polycondensation step may be divided into two steps of b) and c). Substantially, the steps b) and c) are performed sequentially, but there is a difference in the pressure condition. Specifically, the step b) is a process of removing excess diol, and the step c) is a process of increasing viscosity of the poly(ether ester) copolymer.

Step b) of the present invention is a first polycondensation step which is performed under relatively mild conditions, in which the catalyst is added in an additional amount to the reaction mixture of the step a), and then polycondensation is performed while stirring under reduced pressure to obtain a prepolymer.

The pressure at which step b) is performed is preferably in the range of more than 5 torr and 100 torr or less, or 10 torr to 50 torr, and the temperature at which step b) is performed is preferably in the range of 180° C. to 250° C., or 230° C. to 250° C. Under these conditions, excess unreacted diol in the step a) is evaporated and removed. The reaction time of step b) may be, but is not particularly limited to, about 20 minutes to about 1 hour, or about 20 minutes to about 40 minutes.

If the polycondensation is directly performed under high vacuum of 5 torr or less without performing step b), rapid evaporation of unreacted diol may occur to cause bumping in the reactor, and the reduction of the temperature of the reactants may be exacerbated. Further, there is a problem in that it is difficult to obtain a high-viscosity poly(ether ester) copolymer. Accordingly, in the present invention, the first polycondensation step is preliminarily performed under the mild conditions, before performing the polycondensation reaction.

Meanwhile, in step a) or b), one or more additives which are commonly used may be introduced together to improve the reaction efficiency and to control the physical properties of the prepared poly(ether ester) copolymer.

Examples of the additive to be applicable may include branching agents to enhance melt strength of the poly(ether ester) copolymer (e.g., glycerol, sorbitol, pentaerythritol, 1,1,4,4-tetrakis(hydroxymethyl)cyclohexane, trimethylol propane, pyromellitic acid, 1,1,2,2-ethane tetracarbolyxic acid, etc.), delusterants to improve color characteristics (e.g., $TiO_2$, zinc sulfide, or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brightners, extenders, processing aids, viscosity boosters, etc., and any one thereof or a mixture of two or more thereof may be used, but is not limited thereto. For example, to improve heat stability of the poly(ether ester) copolymer, a stabilizer such as a hindered phenol (e.g., Irganox 1098) may be added.

Each of the additives may be used in an appropriate amount within a range that does not deteriorate the physical properties of the prepared poly(ether ester) copolymer while securing the desired effects. Specifically, each additive may be used in an amount of 0.1% by weight to 10% by weight with respect to the total of 100% by weight of the raw materials.

Step c) is a reaction performed consecutively after step b), and is a step of performing polycondensation of the prepolymer in the same reactor by only lowering the pressure. If the temperature at which step c) is performed is too high as above 250° C., the high viscosity property of the prepared poly(ether ester) copolymer may be rather deteriorated, and therefore it is preferable that the temperature satisfies the above range. More preferably, the reaction temperature of step c) may be lower than 250° C.

Further, the pressure at which step c) is performed is lower than that of the step b), and is preferably in the range of 5 torr or less, or 0.5 torr to 3 torr.

Under the above conditions, the polycondensation is performed for about 30 minutes to 5 hours, or 1 hour to 3 hours, and when a torque value reaches 1.5 Nm to 3.0 Nm, the reaction is terminated to finally prepare the poly(ether ester) copolymer.

The poly(ether ester) copolymer prepared by the above method has a polyether content as high as 60% by weight to 90% by weight, preferably 70% by weight to 90% by weight, and therefore the poly(ether ester) copolymer is characterized by having a Shore hardness (Shore D) of less than 40, and preferably 20 to 35. As the poly(ether ester) copolymer has such a low hardness, the copolymer prepared by the present invention may exhibit excellent flexibility.

Further, according to the preparation method of the present invention, the poly(ether ester) copolymer having the high viscosity and the high content of polyether may be prepared by only esterification and polycondensation reactions without solid-phase polymerization. In other words, the poly(ether ester) copolymer prepared by the present invention has a high intrinsic viscosity at 25° C. of more than 2.0, 2.1 or more, or 2.3 to 4.0. In addition, the poly(ether ester) copolymer satisfies a melt index (MI) of 12 g/10 min or less, preferably 10 g/10 min or less, as measured in accordance with ASTM D1238.

According to the present invention, the poly(ether ester) copolymer having the high viscosity and the high content of polyether may be prepared from an inexpensive dicarboxylic acid by the simple process using, as it is, a conventional facility for producing poly(ether ester) copolymers using dicarboxylic acid. Accordingly, the present invention is suitable for mass production and industrial-scale processing, and may improve economic efficiency and productivity of the process.

EXAMPLES

Hereinafter, preferred examples will be provided for better understanding of the present invention. However, the following examples are for illustrative purposes only, and those skilled in the art will appreciate that various changes and modifications are possible, without departing from the scope and technical spirit of the invention, and the changes and modifications belong to scope of the appended claims of the present invention.

Example 1

20 parts by weight of terephthalic acid (PTA), 33 parts by weight of 1,4-butylene glycol (BG), 47 parts by weight of polytetramethylene glycol (PTMG) ($M_n$=2000), and 50 ppm (based on a Ti element) of a TBT catalyst were introduced into a 2 L glass reactor, and the temperature was raised to 200° C. while stirring for 1 hour under a nitrogen atmosphere. A molar ratio of BG/PTA was 3.0, and PTMG was used such that a content of polyether in a PBT-PTMG copolymer was 69% by weight.

An esterification (ES) reaction was performed at 200° C. to 230° C. and at 300 torr for 2 hours. At this time, the reactor was equipped with a reflux condenser and a Dean-Stark trap which were maintained at 120° C., in place of a distillation column, and an ES reaction was performed. After completion of the reaction, a conversion rate of esterification was 97%, which was calculated from the following Mathematical Equation 1 using a density difference of water and THF mixture collected in the Dean-Stark trap.

[Mathematical Equation 1]

THF generation (ml)=(Volume of collection in trap–Weight of collection in trap)/($H_2O$ density–THF density)     (1)

Theoretical $H_2O$ generation (ml) accompanied by THF generation=THF generation*THF density/THF molecular weight*$H_2O$ molecular weight     (2)

Theoretical $H_2O$ generation (ml) upon esterification=PTA input/PTA molecular weight*$H_2O$ molecular weight*$H_2O$ density*2     (3)

Conversion rate of ES reaction (%)=(Volume of collection in trap–(1)+(2))/(3)*100     (4)

After the ES reaction, 50 ppm of a Ti catalyst and 3000 ppm of Irganox 1098 as an antioxidant were introduced into the reactor. After removing the reflux condenser, a first polycondensation (PP) reaction was performed at 230° C. to 240° C. for 30 minutes under reduced pressure of 10 torr. A second polycondensation (PC) reaction was performed at 235° C. to 240° C. for 3 hours at 1 torr or less. During the PC reaction, a torque value of a mechanical stirrer was continuously increased. After the torque value reached 2.3 Nm, the reaction was terminated to obtain a PBT-PTMG copolymer.

Example 2

18 parts by weight of terephthalic acid (PTA), 26 parts by weight of 1,4-butylene glycol (BG), 56 parts by weight of polytetramethylene glycol (PTMG) ($M_n$=2000), and 100 ppm (based on the Ti element) of a Ti catalyst (tetrabutyl titanate, TBT) were introduced into a 2 L glass reactor, and the temperature was raised to 200° C. while stirring for 1 hour under a nitrogen atmosphere. A molar ratio of BG/PTA was 3.0, and PTMG was used such that a content of the polyether in a PBT-PTMG copolymer was 77% by weight.

A PBT-PTMG copolymer was prepared by performing ES, PP, and PC steps in the same manner as in Example 1, except that the starting materials were used as above.

The conversion rate of the esterification was 98%, and the torque was 2.0 Nm when the reaction was terminated.

Example 3

A PBT-PTMG copolymer was prepared in the same manner as in Example 2, except that the molar ratio of BG/PTA was 2.6 and the Ti catalyst was introduced in an amount of 50 ppm and 100 ppm before and after the ES reaction, respectively.

The conversion rate of the esterification was 98%, and the torque was 2.0 Nm when the reaction was terminated.

Example 4

A PBT-PTMG copolymer was prepared in the same manner as in Example 2, except that the molar ratio of BG/PTA was 2.6, the Ti catalyst was introduced in an amount of 200 ppm before and after the ES reaction, respectively, and the PC reaction was performed for 2 hours.

The conversion rate of the esterification was 97%, and the torque was 2.6 Nm when the reaction was terminated.

Example 5

A PBT-PTMG copolymer was prepared in the same manner as in Example 2, except that the molar ratio of BG/PTA was 2.6, the Ti catalyst was introduced in an amount of 200 ppm before and after the ES reaction, respectively, and the PC reaction was performed at 245° C. to 250° C. for 2 hours and 30 minutes.

The conversion rate of the esterification was 97%, and the torque was 1.7 Nm when the reaction was terminated.

Comparative Example 1

A PBT-PTMG copolymer was prepared in the same manner as in Example 3, except that the Ti catalyst was introduced in an amount of 50 ppm only in the ES step.

The conversion rate of the esterification was 97%, as in Example 3, but the torque was as low at 1.0 Nm when the reaction was terminated.

Comparative Example 2

A PBT-PTMG copolymer was prepared in the same manner as in Example 1, except that the Ti catalyst was introduced in an amount of 100 ppm only in the ES step.

The conversion rate of the esterification was 97%, as in Example 1, but the torque was 1.9 Nm when the reaction was terminated.

Comparative Example 3

A PBT-PTMG copolymer was prepared in the same manner as in Example 2, except that the molar ratio of BG/PTA was 2.6, and the Ti catalyst was introduced in an amount of 25 ppm and 125 ppm in the ES step and the PP step, respectively.

The conversion rate of the esterification was merely 51%, and the torque was 0.5 Nm when the reaction was terminated.

Comparative Example 4

A PBT-PTMG copolymer was prepared in the same manner as in Example 2, except that the molar ratio of BG/PTA was 2.5.

The conversion rate of the esterification was 93%, and the torque was 1.8 Nm when the reaction was terminated.

$$[\eta] = \lim_{c \to 0} \frac{\eta sp}{c} \quad \text{[Mathematical Equation 2]}$$

(3) Method of Measuring Melt Index

Samples were dehumidified and dried at 50° C. for 24 hours, and melt indexes thereof were measured in accordance with ASTM D1238 (maintained at 230° C. under a load of 2.16 kg for 4 minutes).

(4) Method of Measuring Hardness

Shore D hardness was measured in accordance with ASTM D2240.

TABLE 1

|  | BG/PTA ratio | Ti catalyst (based on Ti content) | | Intrinsic viscosity | Melt index | Shore D hardness |
|---|---|---|---|---|---|---|
|  |  | ES ppm | PP + PC ppm |  |  |  |
| Example 1 | 3.0 | 50 | 50 | 2.3 | 6.5 | 33 |
| Example 2 | 3.0 | 100 | 50 | 2.2 | 12 | 30 |
| Example 3 | 2.6 | 50 | 100 | 2.3 | 11 | 30 |
| Example 4 | 2.6 | 200 | 200 | 2.7 | 4.0 | 30 |
| Example 5 | 2.6 | 200 | 200 | 2.4 | 6.0 | 30 |
| Comp. Ex. 1 | 3.0 | 50 | 0 | 1.8 | 24 | 33 |
| Comp. Ex. 2 | 3.0 | 100 | 0 | 1.9 | 7.5 | 33 |
| Comp. Ex. 3 | 2.6 | 25 | 125 | 1.6 | 50 | 30 |
| Comp. Ex. 4 | 2.5 | 100 | 50 | 1.9 | 10 | 30 |
| Comp. Ex. 5 | 1.7 | 200 | 200 | 2.0 | 15 | 30 |

Comparative Example 5

A PBT-PTMG copolymer was prepared in the same manner as in Example 5, except that the molar ratio of BG/PTA was 1.7, and the PC reaction was performed for 3 hours.

The conversion rate of the esterification was 86%, and unlike Example 3, the torque no longer increased at 1.1 Nm.

Experimental Example

The PTMG content, intrinsic viscosity ($[\eta]$) at 25° C., and melt index (dg/min) of each of the PBT-PTMG copolymers prepared in the examples and comparative examples were measured by the following method, and the results are shown in the following Table 1.

(1) Method of Measuring PTMG Content

About 10 mg~20 mg of the copolymer was added to 1 ml of a mixed solution of chloroform-d and trifluoroacetic acid-d (at a ratio of 10:1), and stirred at room temperature until the copolymer was completely dissolved. The $^1$H NMR (500 MHz, Agilent) spectrum was measured to analyze PBT and PTMG contents.

(2) Method of Measuring Intrinsic Viscosity

After polymer solutions (solvent: o-chlorophenol) of different concentrations were prepared, zero shear viscosity was measured to determine the intrinsic viscosity. Zero shear viscosity was determined by viscosity which was measured using a rotational rheometer, DHR II [TA Instruments, USA] at a shear rate of 50 s$^{-1}$.

The polymer solutions were prepared at concentrations of 2 wt %, 1 wt %, 0.5 wt %, and 0.25 wt %. Specific viscosity ($\eta sp$) was measured according to the concentration (c), and was used to calculate the intrinsic viscosity from the following Mathematical Equation 2.

Referring to Table 1, when the molar ratio of BG/PTA was more than 2.5, and the catalyst was introduced in an amount of 50 ppm or more in the ES reaction and the PP reaction, respectively (Examples 1 to 5), the conversion rate of esterification was 97% or more even though the content of PTMG was as high as 75% by weight or more, and the prepared PBT-PTMG copolymers had high intrinsic viscosity at 25° C. of 2.2 or more and a melt index of 12 or less at 230° C. under a load of 2.16 kg.

However, when the catalyst was introduced, while not divided, into the ES reaction and the PP reaction (Comparative Examples 1 and 2), the intrinsic viscosity was 1.9 or less, indicating that they did not satisfy the high viscosity property.

Further, when the amount of the catalyst introduced in the ES reaction and the PP reaction was less than 50 ppm, respectively (Comparative Example 3), or when the molar ratio of BG/PTA was 2.5 or less (Comparative Examples 4 and 5), the conversion rate of esterification was less than 95%, and all had intrinsic viscosity of 2.0 or less, indicating that they did not satisfy the high viscosity property.

From these results, it was confirmed that the molar ratio of diol/dicarboxylic acid and the divided addition of the catalyst must all be satisfied, in order to prepare a poly(ether ester) copolymer having a high content of the polyether and having low hardness and high viscosity properties.

The invention claimed is:

1. A method of preparing a poly(ether ester) copolymer having a polyether content of 60% by weight to 90% by weight and an intrinsic viscosity at 25° C. of more than 2.0, the method comprising:
    forming a reaction mixture by reacting a mixture comprising a diol, a dicarboxylic acid, a polyether diol, and a first amount of a catalyst;

introducing an additional amount of the catalyst to the reaction mixture and performing a first polycondensation to prepare a prepolymer; and performing a second polycondensation of the prepolymer under a lower pressure condition than that of the first polycondensation, wherein a molar ratio of the diol/dicarboxylic acid introduced in the reaction mixture is more than 2.5, and an amount of the catalyst introduced each in the reaction mixture and first polycondensation is 50 ppm or more, based on an active metal.

2. The method of claim 1, wherein the forming the reaction mixture is performed in a reactor equipped with a distillation column, which is maintained at 80° C. to 150° C.

3. The method of claim 1, wherein the forming the reaction mixture is performed under a temperature of 150° C. to 300° C., and a pressure of 100 torr or more and less than 760 torr.

4. The method of claim 1, wherein the first polycondensation is performed under a temperature of 180° C. to 250° C. and a pressure of more than 5 torr to 100 torr.

5. The method of claim 1, wherein the second polycondensation is performed under a temperature of 180° C. to 250° C. and a pressure of 5 torr or less.

6. The method of claim 1, wherein a total amount of the catalyst introduced in the forming the reaction mixture and the first polycondensation is less than 500 ppm.

7. The method of claim 1, wherein the polyether diol has a number average molecular weight of 500 g/mol to 3000 g/mol.

8. The method of claim 1, wherein the poly(ether ester) copolymer has an intrinsic viscosity at 25° C. of 2.2 or more.

9. The method of claim 1, wherein the poly(ether ester) copolymer has a melt index of 12 g/10 min or less, as measured in accordance with ASTM D1238.

10. The method of claim 1, wherein the poly(ether ester) copolymer has Shore D hardness of 40 or less.

11. The method of claim 1, wherein the polyether diol is added in an amount of 35% to 90% by weight, with respect to a total of 100% by weight of the diol, the dicarboxylic acid, and the polyether diol.

12. The method of claim 1, wherein the polyether diol comprises polytetramethylene glycol.

* * * * *